United States Patent [19]

Oehrig

[11] 4,326,103
[45] Apr. 20, 1982

[54] COIN TELEPHONE MONITOR CIRCUIT

[75] Inventor: Kenneth H. Oehrig, Plainfield, Ill.

[73] Assignee: GTE Automatic Electric Labs Inc., Northlake, Ill.

[21] Appl. No.: 155,720

[22] Filed: Jun. 2, 1980

[51] Int. Cl.³ .................. H04M 3/22; H04M 17/02
[52] U.S. Cl. .................. 179/6.3 R; 179/175.2 C
[58] Field of Search ............ 179/6.3 R, 18 FA, 18 F, 179/1 MN, 175.2 C

[56] References Cited

U.S. PATENT DOCUMENTS 3,456,081  7/1969  Pharis et al. ............ 179/6.3 R
4,166,928  9/1979  Sabon ..................... 179/18 FA
4,206,321  6/1980  McElliott ................ 179/6.3 R

*Primary Examiner*—Thomas W. Brown
*Attorney, Agent, or Firm*—Robert J. Black; Gregory G. Hendricks

[57] ABSTRACT

A circuit which monitors a coin telephone for coin ground, coin collect, coin return, stuck coin and ground fault conditions. Hall effect devices are used to detect the status of these conditions and to provide isolation between the coin telephone line and the coin telephone monitor circuit.

11 Claims, 1 Drawing Figure

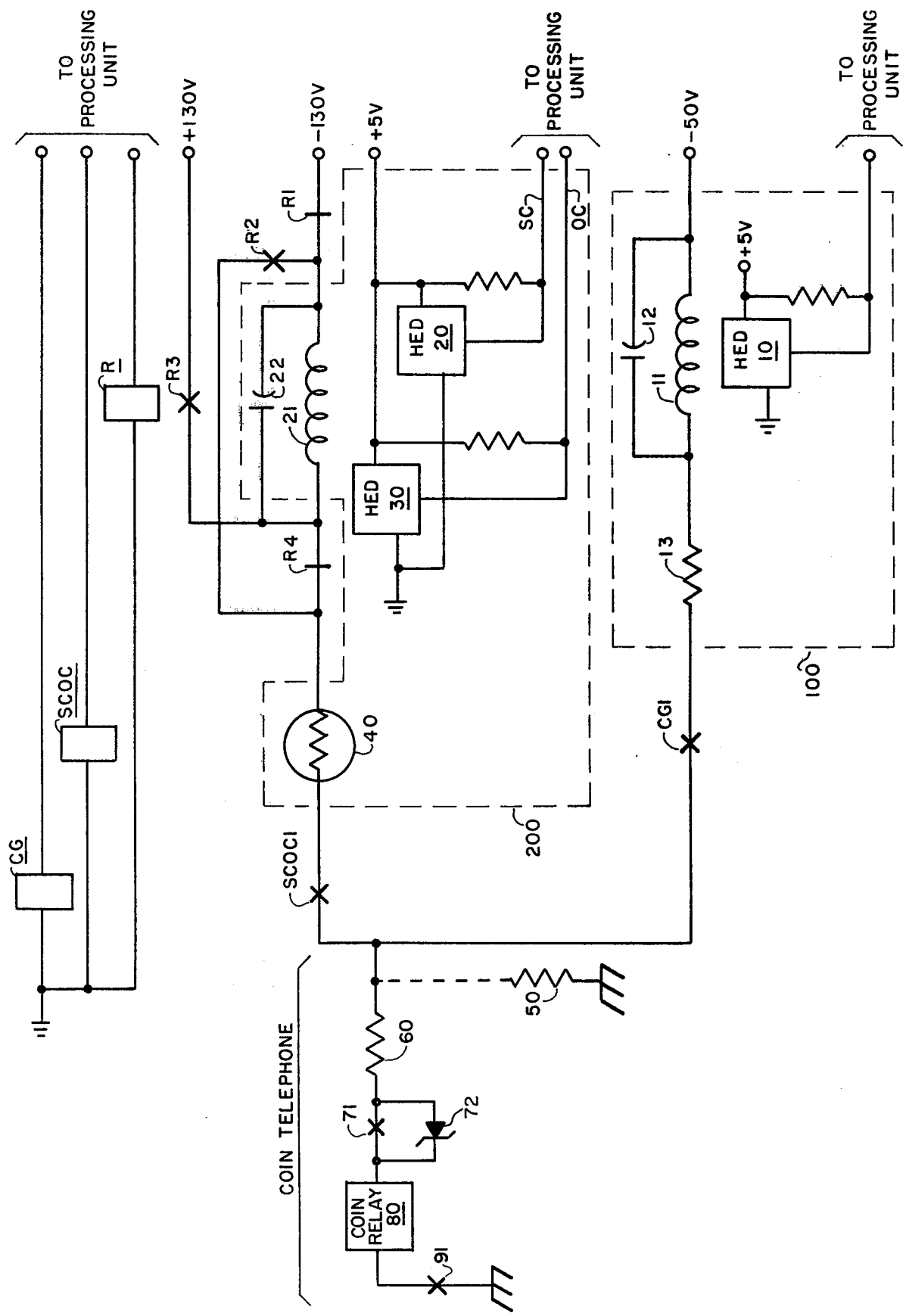

COIN TELEPHONE MONITOR CIRCUIT

BACKGROUND OF THE INVENTION (1) Field of the Invention

The present invention relates to coin telephone line circuits and more particularly to a circuit for monitoring the current thresholds associated with coin telephone operations.

(2) Description of the Prior Art

Previous methods of monitoring coin telephone operations include relay and electronic circuits. Relay circuits have the drawbacks of high cost, large space requirements, contact wear problems, and still require interface circuitry to make their output compatible with digital sense circuitry. Electronic sensors require complex electronic circuits of a large number of components and must be connected to the telephone line thereby being subject to high voltage transients from lightening and high inductance voltage spikes from the coin relay. Even the most recent electronic sensors, which use optical couplers to isolate the line from the digital sense logic, are susceptible to high voltage failure since they require a solid state diode LED to be connected to the line.

Accordingly, it is the object of the present invention to provide a coin telephone monitor circuit using a minimal amount of highly reliable electronic circuitry which is completely isolated from the telephone line and thereby not susceptible to high voltage transients.

SUMMARY OF THE INVENTION

The present invention is a circuit which monitors the current thresholds of a coin telephone in order to detect the presence of a coin ground path, and coin collection, coin return, stuck coin and ground fault conditions. This circuit is included in the line equipment of a telephone central office and is connected to a coin telephone station.

This circuit consists of three Hall effect devices, associated coils, and relays used to connect the coils to the telephone line. The coil associated with the first Hall effect device is connected to the coin telephone line to check for coin ground which indicates that coins equal to the initial rate requirement have been deposited.

The coil associated with the second Hall effect device is connected to the coin telephone line to perform coin collect, coin return and stuck coin tests. This coil is connected to the telephone line to monitor it for an absence of current flow which indicates that the coin relay has disconnected the ground path in response to a normal coin collection or coin return operation. If current is detected it indicates that the coin relay did not disconnect the ground path due to a failure in the coin collection or coin return operation. Such a failure is typically caused by a stuck coin condition.

A third Hall effect device is associated with the same coil as the second Hall effect device. This Hall effect device has a different magnetic flux threshold and thus will not operate in response to normal ground current associated with stuck coin conditions. It does operate, however, in response to a ground fault condition in which case excessive current flows, typically in excess of 115 milliamps. In the event of such a ground fault condition, a series connected positive temperature thermistor operates to limit the average current to typical levels of 20 milliamps to protect the sensor coil and coin power supply.

DESCRIPTION OF THE DRAWING

The single FIGURE of the accompanying drawing is a schematic diagram of a coin telephone monitor circuit in accordance with the present invention.

DESCRIPTION OF THE PREFERRED EMBODIMENT

Referring now to the accompanying drawing, the coin telephone monitor circuit of the present invention is shown connected to a coin telephone which includes 900 ohm line 60 connected to ground via initial rate contacts 71, coin relay 80 and coin trigger contacts 91. The coin telephone monitor circuit includes coin ground sensor 100 connected to the coin telephone via make contacts CG 1. This circuit also includes stuck coin/over current sensor 200 connected to the coin telephone via make contacts SCOC 1.

Coin ground sensor 100 includes current limiting resistor 13 connected to the parallel combination of induction coil 11 and by-pass capacitor 12, both of which are connected to a minus 50 volt power supply. Hall effect device 10 is shown connected in magnetic flux proximity to induction coil 11 and its output is connected to the processing unit. Stuck coin/over current sensor 200 includes thermistor 40 connected via break contacts R4 to the parallel combination of induction coil 21 and by-pass capacitor 22, which is connected to a minus 130 volt power supply via break contacts R1. Thermistor 40 is further connected to the minus 130 volt power supply via make contacts R2 and break contacts R1. Thermistor 40 is also connected to the plus 130 volt power supply via break contacts R4 and make contacts R3. Coin ground relay CG, struck coin/over current relay SCOC and routing relay R are shown connected to the processing unit.

When a user of the coin telephone deposits a coin, coin trigger contacts 91 are operated to connect coin relay 80 to ground. When the user deposits sufficient coins to meet the initial rate deposit requirements, initial rate contacts 71 are operated. Thus the coin telephone monitor circuit is connected to ground upon deposit of coins equal to the initial rate requirement. To verify such initial rate deposit, the processing unit, upon completion of the transmission of dialed or dual tone multi-frequency digits, operates coin ground relay CG which causes make contacts CG1 to connect coin ground sensor 100 to the coin telephone. This relay will remain operated for approximately 300 milliseconds during which current flows from the minus 50 volt power supply through coil 11, resistor 13, 900 ohm line 60 and coin relay 80 to ground. Coil 11 operates in response to the current flowing through it to generate a proportional magnetic flux. Hall effect device 10 detects this magnetic flux and generates a logic 0 signal to the processing unit to indicate that coins equal to the initial rate have been deposited so call completion can proceed. If the ground circuit is not completed in the coin telephone, current will not flow through inductor 11 and Hall effect device 10 will indicate a logic 1 signal to the processing unit which will then cause the coin telephone to be disconnected.

At the completion of the call the deposited coins must either be collected or returned. The positive 130 volt power supply is used to cause the coin relay to collect the deposited coins and the minus 130 volt power supply is used to cause the coin relay to return the deposited coins.

To perform the coin return operation, the processing unit operates stuck coin/over current relay SCOC for 600 milliseconds. Therefore make contacts SCOC1 connect stuck coin/over current sensor 200 to the coin telephone and current flows from the minus 130 volt power supply through induction coil 21, thermistor 40, 900 ohm line 60 and coin relay 80 to ground. Coin relay 80 then operates to route the deposited coins to a coin return slot in the coin telephone. Zener diode 72 provides a path for coin return current in the event that initial rate deposit contacts 71 do not close due to deposit of insufficient coins. This Zener diode however will block loop current from the minus 50 volt power supply.

If the processing unit had determined that the deposited coins were to be collected, it would also operate routing relay R which would cause the plus 130 volt power supply to be connected to the coin telephone via make contacts R3, induction coil 21, make contacts R2 and thermistor 40. The operation of routing relay R would also cause break contacts R4 and R1 to disconnect the minus 130 volt power supply from induction coil 21. Since Hall effect devices are polarity sensitive, the plus 130 volt power supply and minus 130 volt power supply must both be connected to induction coil 21 in such a manner as to cause current to flow through induction coil 21 in the same direction. Thus routing relay make contacts R3 and R2 operate to connect the plus 130 volt power supply to induction coil 21 in such a manner as to cause current to flow through it in the same direction as when minus 130 volt power supply is connected to induction coil 21 by break contacts R1 and R4. Since 600 milliseconds is sufficient time for coin relay 80 to collect or return deposited coins, stuck coin/over current relay SCOC and routing relay RR are released at the end of the 600 millisecond period.

After waiting an additional 600 milliseconds the processing unit again operates stuck coin/over current relay SCOC for an additional 600 milliseconds. During this second 600 millisecond period stuck coin/over current sensor 200 operates to test for a stuck coin condition. If coin relay 80 operates to collect or return coins, coin trigger contacts 91 are released, thereby disconnecting the stuck coin/over current sensor from ground. However if coin relay 80 was unable to collect or return coins because of a stuck coin condition, coin trigger contacts 91 are not to be released and stuck coin/over current sensor remains connected to ground. If current flows through inductor 21 during this second 600 millisecond period, inductor 21 generates a magnetic flux which is proportional to the current flowing through it. Hall effect device 20 detects this magnetic flux and generates a logic 0 signal to indicate the stuck coin condition to the processing unit. If coin relay 80 operated to collect or return the deposited coins, coin trigger contacts 91 would release and there would be no ground connection to inductor 21 and consequently current would not flow through inductor 21. In the absence of such current flow, inductor 21 would not generate a magnetic flux and Hall effect device 20 would consequently generate a logic 1 signal to the processing unit to indicate the absence of a stuck coin condition.

Hall effect device 30 also operates in response to magnetic flux generated by inductor 21. However it is positioned more remotely then Hall effect device 20, in relation to magnetic flux proximity to inductor 21. Therefore it only detects the presence of magnetic flux when higher current levels pass through an inductor 21. Hall effect device 20 will detect magnetic flux densities generated in response to current levels passing through of approximately 40 milliamps, but Hall effect device 30 will not detect magnetic flux densities generated in response to current levels of less than approximately 115 milliamps. Should such current levels exist, Hall effect device 30 will generate a logic 0 signal to indicate the over current condition. Thermistor 40 then operates with sufficient speed to limit the average current to a safe level, typically 20 milliamps and thereby protect coil 21 and the 130 volt power supplies. These over current conditions are typically caused by ground fault conditions such that 900 ohm line 60 and coin relay 80 are erroneously shorted to ground. This ground fault condition is represented by resistor 50.

The coin telephone monitor circuit of the present invention monitors a coin telephone line for ground connections. If coins are deposited which satisfy the initial rate requirements, the coin trigger contacts and initial rate contacts will connect the coin ground sensor to ground and it will indicate to the processor that the initial rate has been deposited and the call can be completed. The stuck coin/over current sensor operates to detect ground conditions after application of coin collect or coin return battery. A ground condition at this time will indicate a stuck coin condition and will be so indicated to the processor. In the event of a ground fault condition the over current sensor generates a signal indicating such condition to the processing unit.

It will be obvious to those skilled in the art that numerous modifications of the present invention can be made without departing from the spirit of the invention which shall be limited only by the scope of the claims appended hereto.

What is claimed is:

1. A coin telephone monitor circuit for use in a telephone switching system including a line battery power supply, a processing unit operated to generate a coin ground test signal, and a coin telephone including a telephone line, said coin telephone operated in response to deposit of a predetermined number of coins, to connect said line to ground, said coin telephone monitor circuit comprising:
   coin ground detection means;
   switching means connected to said processing unit and said telephone line, operated in response to said coin ground test signal to connect said coin ground detection means to said telephone line;
   an induction coil connected to said line battery supply, operated in response to current flow from said line battery supply through said induction coil to said ground to generate a magnetic flux; and
   a Hall effect device connected in magnetic field proximity to said induction coil, operated in response to said magnetic flux to generate an initial rate deposited signal.

2. A coin telephone monitor circuit as claimed in claim 1, wherein said coin ground detection means further includes: a resistor connected to said induction coil effective to limit current flow through said induction coil.

3. A coin telephone monitor circuit as claimed in claim 1, wherein said coin ground detection means further includes: a capacitor connected in parallel with said induction coil operated to shunt AC current from said induction coil.

4. A coin telephone monitor circuit as claimed in claim 1, wherein said switching means comprise a relay.

5. A coin telephone monitor circuit for use in a telephone switching system including a processing unit operated to generate a coin relay test signal, said switching system further including a coin telephone including a telephone line connectable to ground via a fault condition, and a coin trigger switch, operated in response to deposit of a coin to connect said line to ground, said coin telephone operated in a first manner to cause disposal of said deposited coins and said coin telephone operated in a second manner to prevent disposal of said deposited coins, said trigger switch further operated in response to disposal of said deposited coins to remove said ground connection, said coin telephone monitor circuit comprising:

coin relay monitor means; and switching means connected to said processing unit and said telephone line, operated in response to said coin relay test signal to connect said coin relay monitor means to said telephone line;

said coin relay monitor means operated in response to detection of removal of said ground connection to generate a coin disposal signal, and further operated in response to detection of said ground connection to generate a stuck coin signal; and said coin relay monitor means further operated in response to connection of said telephone line to ground via said fault condition to generate an over current signal.

6. A coin telephone monitor circuit as claimed in claim 5, wherein said switching means comprise a relay.

7. A coin telephone monitor circuit as claimed in claim 5, wherein there is further included a coin battery power supply, said coin relay monitor means comprising:

an induction coil connected to said coin battery supply, operated in response to current flow from said coin battery supply through said induction coil to said ground to generate a magnetic flux of a first characteristic;

a first Hall effect device connected in magnetic field proximity to said induction coil operated in response to said magnetic flux of said first characteristic to generate said stuck coin signal;

said first Hall effect device further operated in response to an absence of said magnetic flux of said first characteristic to generate said coin disposal signal;

said induction coil further operated in response to current flow from said coin battery supply through said induction coil to ground via said fault condition to generate a magnetic flux of a second characteristic; and a second Hall effect device connected in magnetic field proximity to said induction coil, operated in response to said magnetic flux of said second characteristic to generate said over current signal.

8. A coin telephone monitor circuit as claimed in claim 7, wherein each coin relay monitor means further includes a capacitor connected in parallel with said induction coil, operated to shunt current from said induction coil.

9. A coin telephone monitor circuit as claimed in claim 5, wherein there is further included: a thermistor connected in series with said coin relay monitor means, operated in response to current flow from said coin battery supply, through said coin relay monitor means and said thermistor to ground via said fault condition, to limit current flow through said coin battery supply.

10. A coin telephone monitor circuit as claimed in claim 7, wherein said processing unit is further operated to generate a routing signal, said coin battery supply providing coin battery potentials of first and second polarities, and said induction coil includes first and second terminals, said coin telephone monitor circuit further comprises:

a routing relay, connected between said coin battery supply and said induction coil, operated in response to said routing signal from said processing unit to apply said coin battery of said first polarity to said first terminal of said induction coil and further operated to apply said coin battery of said second polarity to said second terminal of said induction coil, whereby uni-directional current flows through said induction coil in response to connection of said coin battery potential of said first or second polarity to said induction coil.

11. A coin telephone monitor circuit as claimed in claim 7, wherein: said coin battery supply provides coin battery potential of a first polarity or coin battery potential of a second polarity, said coin relay monitor circuit further comprising: a bridge circuit connected between said coin battery power supply and said induction coil, operated to cause uni-directional current flow through said induction coil in response to said coin battery potential of said first or said second polarity.

* * * * *